United States Patent
Ventura et al.

(10) Patent No.: US 11,662,025 B2
(45) Date of Patent: May 30, 2023

(54) MECHANICAL SEAL WITH SLIDING SURFACES WITH MINIMUM DIAMETER

(71) Applicant: MECCANOTECNICA UMBRA—S.P.A., Campello sul Clitunno (IT)

(72) Inventors: Alessandro Ventura, Terni (IT); Luigi Massimiliano Ferri, Campello sul Clitunno (IT)

( * ) Notice: Subject to any disclaimer, the term of this patent is extended or adjusted under 35 U.S.C. 154(b) by 25 days.

(21) Appl. No.: 17/308,225

(22) Filed: May 5, 2021

(65) Prior Publication Data
US 2021/0317917 A1 Oct. 14, 2021

(30) Foreign Application Priority Data
Apr. 14, 2020 (IT) .................. 102020000011128

(51) Int. Cl.
*F16J 15/32* (2016.01)
*F16J 15/34* (2006.01)

(52) U.S. Cl.
CPC ........... *F16J 15/3436* (2013.01); *F16J 15/32* (2013.01)

(58) Field of Classification Search
CPC ............................... F16J 15/3436; F16J 15/32
See application file for complete search history.

(56) References Cited

U.S. PATENT DOCUMENTS

| | | | | |
|---|---|---|---|---|
| 4,440,403 A * | 4/1984 | Urano | ................... | G03B 17/08 |
| | | | | 277/504 |
| 5,072,948 A * | 12/1991 | Kostrzewski | .......... | F16J 15/348 |
| | | | | 277/408 |
| 7,090,221 B2 * | 8/2006 | Matsui | ................ | F16J 15/3456 |
| | | | | 277/390 |
| 2018/0269743 A1 * | 9/2018 | Büttner | .................. | H02K 5/124 |

FOREIGN PATENT DOCUMENTS

EP 3564560 A1 11/2019

OTHER PUBLICATIONS

Search Report for corresponding Italian Application No. 102020000011128, dated Jan. 26, 2021 (Note English text on final pages).

* cited by examiner

*Primary Examiner* — Vishal A Patel
(74) *Attorney, Agent, or Firm* — Egbert, McDaniel & Swartz, PLLC

(57) ABSTRACT

A mechanical seal having a first seal ring, which is mounted in a receptacle of a fixed part, and a second seal ring, which is mounted in a sleeve of a rotary part having a fixing portion fixed to a rotary shaft. The second seal ring extends radially inwards relative to the fixing portion of the sleeve, above an upper ending surface of the rotary shaft. The first seal ring is disposed above the second seal ring in such a way that the sliding surfaces of the first seal ring and of the second seal ring are in mutual contact. The sliding surfaces of the first seal ring and of the second seal ring have a mean diameter that is lower than an external diameter of the rotary shaft.

8 Claims, 6 Drawing Sheets

MECHANICAL SEAL WITH SLIDING SURFACES WITH MINIMUM DIAMETER

CROSS-REFERENCE TO RELATED APPLICATIONS

Not applicable.

BACKGROUND OF THE INVENTION

1. Field of the Invention

The present invention relates to a mechanical seal suitable for being disposed between a rotary shaft and an orifice of a casing. Such a type of seal is especially suitable for being used for electric motors of electric vehicles with coolant refrigeration system in order to isolate the coolant from the electric parts of the motor and from the bearings that support the rotary shaft of the motor.

2. Description of Related Art Including Information Disclosed Under 37 CFR 1.97 and 37 CFR 1.98

In the following description, the terminology "lower, upper, under and above" will refer to the arrangement of the appended figures.

With reference to FIG. 1, a mechanical seal (200) of traditional type according to the prior art is disclosed.

The mechanical seal (200) comprises:
a fixed part (1) comprising a first seal ring (10),
a rotary part (2) comprising a second seal ring (20), and
a spring (M) disposed in the fixed part (1) in such a way to push the first seal ring (10) towards the second seal ring (20).

In view of the above, the mechanical seal separates a liquid chamber, wherein a working liquid is contained, from an air chamber.

The rotary part (2) comprises a sleeve (3) fixed to a rotary shaft (104). The sleeve (3) has a fixing portion (35) fixed to the rotary shaft (104) and a housing portion (231) suitable for containing a gasket (205) and the second seal ring (20).

The fixing portion (35) has a cylindrical shape and is disposed around the rotary shaft (104). The housing portion (231) radially protrudes outwards from the fixing portion (30) and has an annular shape with overturned "U" section. Therefore, the second seal ring (20) extends radially outwards relative to the fixing portion (35) of the sleeve. Moreover, the first seal ring (10) is disposed under the second seal ring (20).

Considering that the external diameter of the rotary shaft (104) is fixed during the design stage, the internal diameter of the first seal ring (10) and of the second seal ring (20) must be substantially higher than the external diameter of the rotary shaft (104). Therefore, the mean diameter of the sliding tracks of the seal rings will be certainly higher than the external diameter of the rotary shaft.

FIG. 2 shows a mechanical seal (300) according to the prior art, wherein the rotary shaft (104) comprises a hollow shaft (4) with an axial cavity wherein a conduit (8) is disposed axially for the introduction of a coolant in the direction of the arrow F1.

The hollow shaft (4) has an external surface (40) and an internal surface (41). The conduit (8) has an external surface (80). An annular empty space (42) in communication with the interior of the conduit (8) is generated between the external surface of the conduit (8) and the internal surface (41) of the hollow shaft (4). In view of the above, the coolant can flow in the annular empty space (42) in the direction of the arrow F2.

In such a case, the fixing portion (35) of the sleeve (3) always has a cylindrical shape and is fixed to the internal surface (41) of the hollow shaft, and the housing portion (231) of the sleeve always has an annular shape and extends radially outwards above one end (45) of the hollow shaft.

In order to minimize a tilting movement of the mechanical seal, the gasket (205) and the second seal ring (20) abut on the upper end (45) of the hollow shaft (4). The second seal ring (20) must protrude externally from the hollow shaft, in such a way to go in contact with the first seal ring (10) disposed around the hollow shaft (4) under the second seal ring (20).

Considering that the external diameter of the hollow shaft (4) is fixed during the design stage, the internal diameter of the first seal ring (10) must be higher than the external diameter of the hollow shaft. Moreover, the external diameter of the second seal ring must be higher than the external diameter of the hollow shaft. Consequently, the mean diameter of the sliding tracks of the seal rings will be certainly higher than the external diameter of the hollow shaft (4).

The mechanical seals (200) and (300) of the prior art are impaired by the fact that the mean diameters of the sliding tracks of the first seal ring and of the second seal ring are very high, namely higher than the external diameter of the rotary shaft or of the hollow shaft.

Evidently, the higher the diameter of the sliding tracks of the seal, the more difficult the construction will be in terms of seal, alignment and sliding of the sliding surfaces of the seal rings.

EP3564560 discloses a mechanical seal according to the preamble of claim 1.

BRIEF SUMMARY OF THE INVENTION

The purpose of the present invention is to eliminate the drawbacks of the prior art by disclosing a mechanical seal that is capable of minimizing the mean diameter of the sliding surfaces of the seal rings.

Another purpose is to disclose such a mechanical seal that is safe, reliable, inexpensive and simple to make and install.

These purposes are achieved by a mechanical seal according to claim 1.

Advantageous embodiments of the invention appear from the dependent claims.

The mechanical seal of the invention is disclosed in claim 1.

BRIEF DESCRIPTION OF THE SEVERAL VIEWS OF THE DRAWINGS

Additional features of the invention will appear manifest from the following detailed description, which refers to a merely illustrative, not limiting embodiment, as shown in the appended figures, wherein.

DETAILED DESCRIPTION OF THE INVENTION

Figure 1:
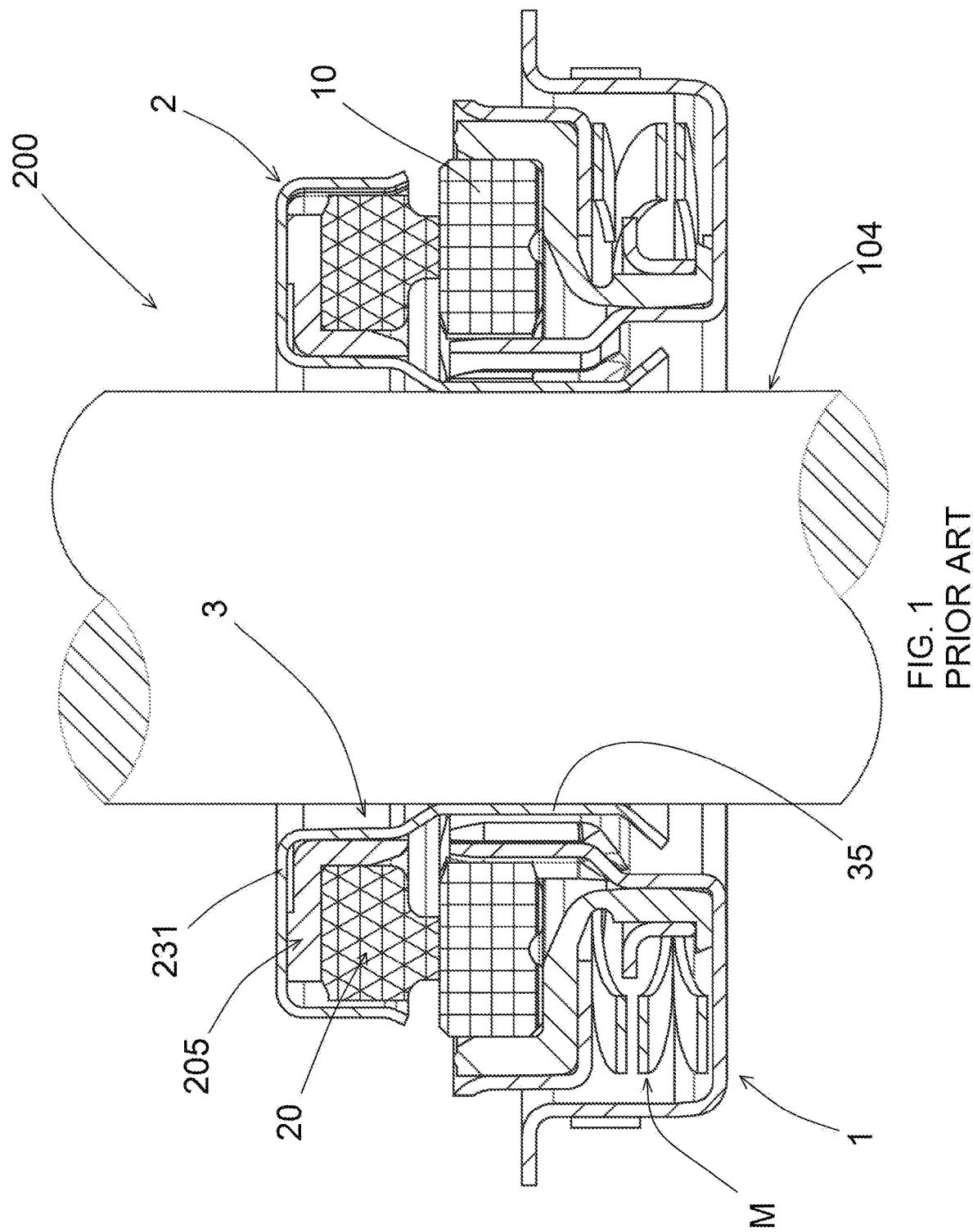
FIG. 1 is an axial view of a traditional mechanical seal according to the prior art.
Figure 2:
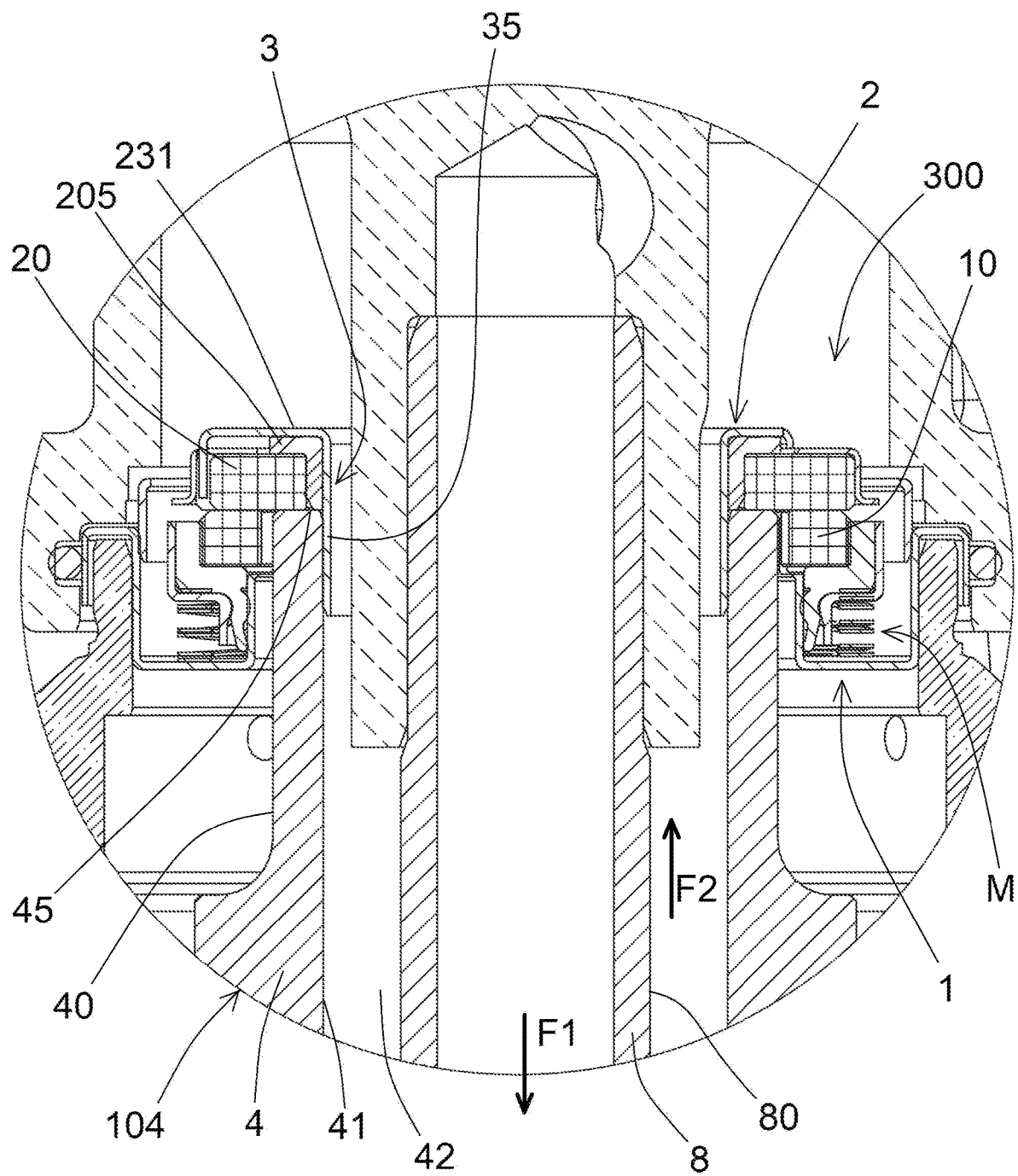
FIG. 2 is an axial view of a mechanical seal according to the prior art applied to a hollow shaft.

With reference to the FIGS. 3 to 6, a mechanical seal according to the invention is disclosed, which is generally indicated with reference numeral (100).

Figure 3:
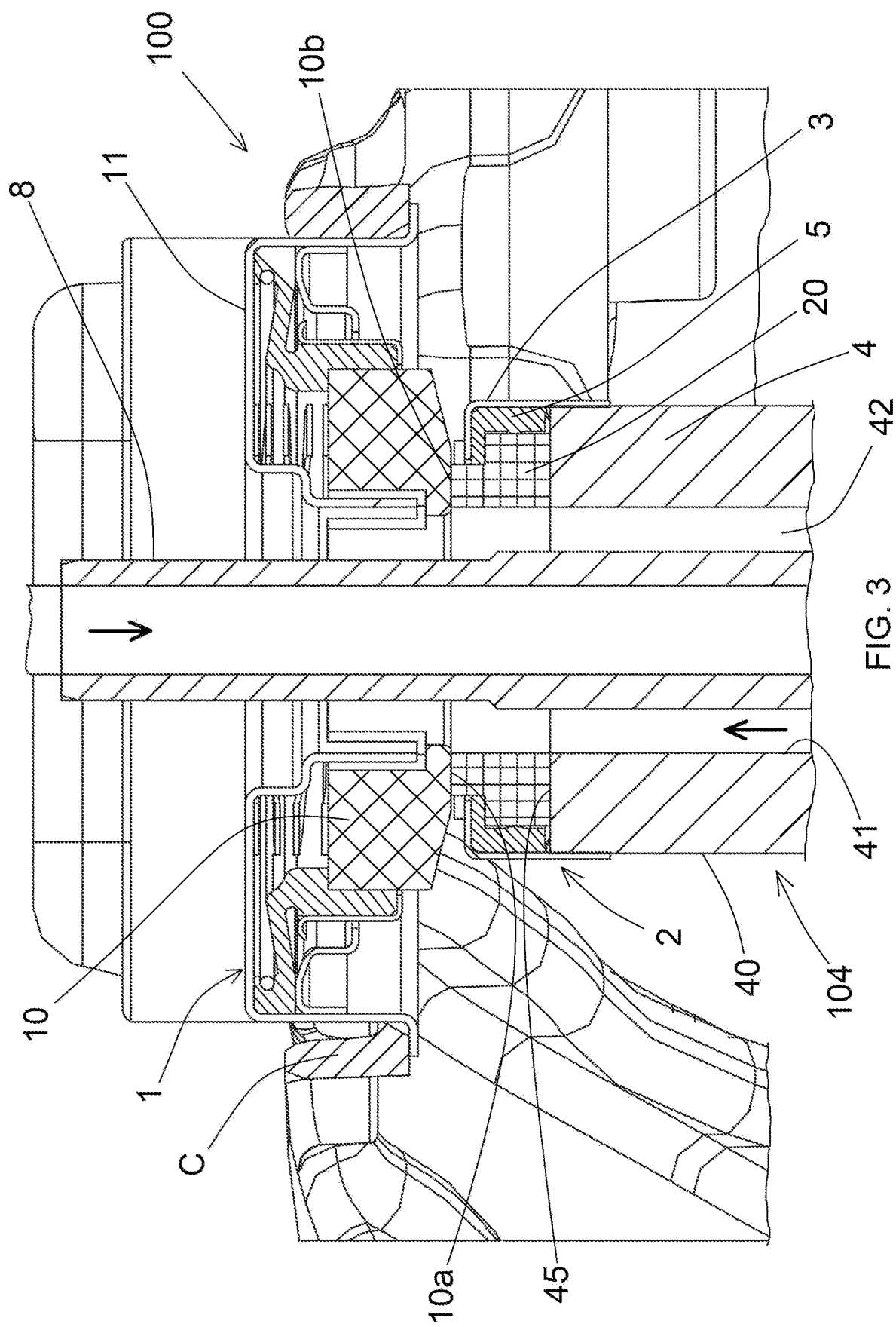
FIG. 3 is an axial view of a mechanical seal according to the invention.

With reference to FIG. 3, the mechanical seal (100) comprises:
- a fixed part (1) suitable for being fixed to a casing (C) suitable for containing a coolant, and
- a rotary part (2) suitable for being fixed to a rotary shaft (104).

The fixed part (1) comprises a first seal ring (10). The rotary part (2) comprises a second seal ring (20). The two seal rings (10, 20) have sliding surfaces (10a, 20a) (FIG. 4) that cooperate to provide a front sliding seal.

The seal rings (10, 20) are conveniently made of ceramic material, for example silicon carbide or carbonaceous material.

Figure 4:
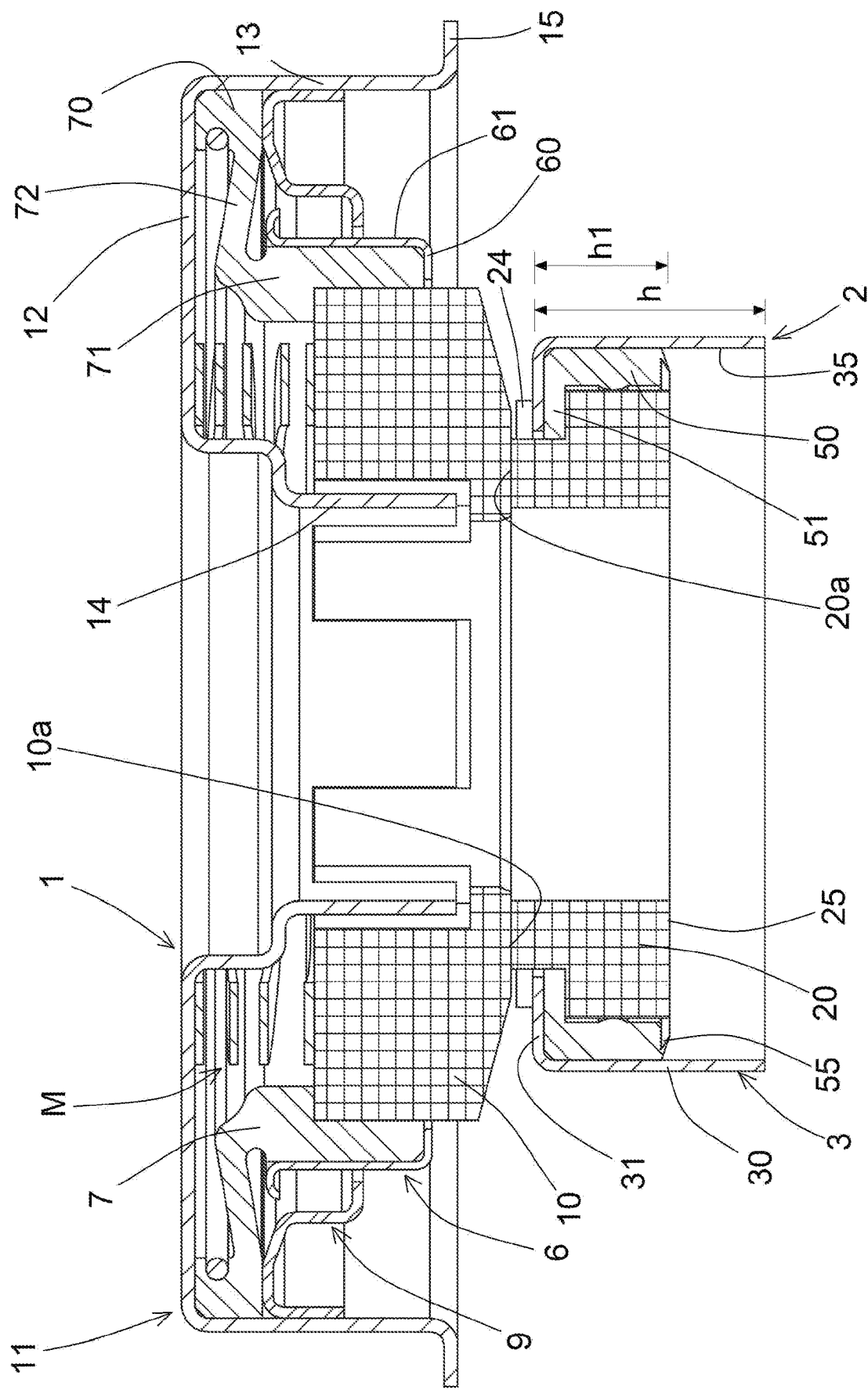
FIG. 4 is an axial view of the mechanical seal of FIG. 3, wherein the hollow shaft and the casing are omitted.

With reference to FIG. 4, the fixed part (1) comprises an annular receptacle (11) made of sheet metal by means of a deep drawing process. The annular receptacle (11) comprises:
- a flat annular upper wall (12),
- an external cylindrical wall (13) that extends from an external edge of the upper wall,
- a tubular internal wall (14) in coaxial position relative to the external wall (13),
- a flange (15) that extends radially outwards from one end of the external wall (13).

A retention ring (9) made of deep-drawn sheet metal is fixed to the external cylindrical wall (13) of the receptacle and protrudes inwards.

The first seal ring (10) is mounted inside a dish (6) that is housed in the receptacle (11) in such a way to slide axially. A bellows-like gasket (7) made of elastomeric material is disposed between the first seal ring (10) and the dish (6).

The dish (6) comprises:
- a flat annular bottom (60) facing the upper wall (12) of the receptacle, and
- a cylindrical wall (61) that extends axially from an external edge of the bottom (60) in such a way to enclose the gasket (7) at least partially.

The gasket (7) comprises:
- a first annular portion (70) disposed between the retention ring (9) and the upper wall (12) and the lateral wall (13) of the dish (6),
- a second annular portion (71) disposed between the lateral wall (61) and the dish and the first seal ring (10), and
- a bellows-like portion (72) that connects the first annular portion (70) with the second annular portion (71) of the gasket (7).

The first seal ring (10) is axially blocked inside the dish (6) by means of radial interference, namely by radially compressing the second annular portion (71) of the gasket (7).

The mechanical seal (100) also comprises a spring (M) housed in the receptacle (11) and compressed axially between the upper wall (12) of the receptacle and the first seal ring (10), in such a way to push the first seal ring (10) downwards against the second seal ring (20).

As shown in the example, the spring (M) is a helical spring that is realized with a flat wire, such as the springs marketed under the name Crest-to-Crest® by Smalley. Nevertheless, the spring (M) can be replaced by an annular wave spring or by a traditional cylindrical helical spring.

The rotary part (2) of the mechanical seal (100) comprises a sleeve (3).

The sleeve (3) comprises a cylindrical lateral wall (30) and a plurality of radial fins (31) that protrude radially inwards from an upper edge of the cylindrical lateral wall.

Figure 6:
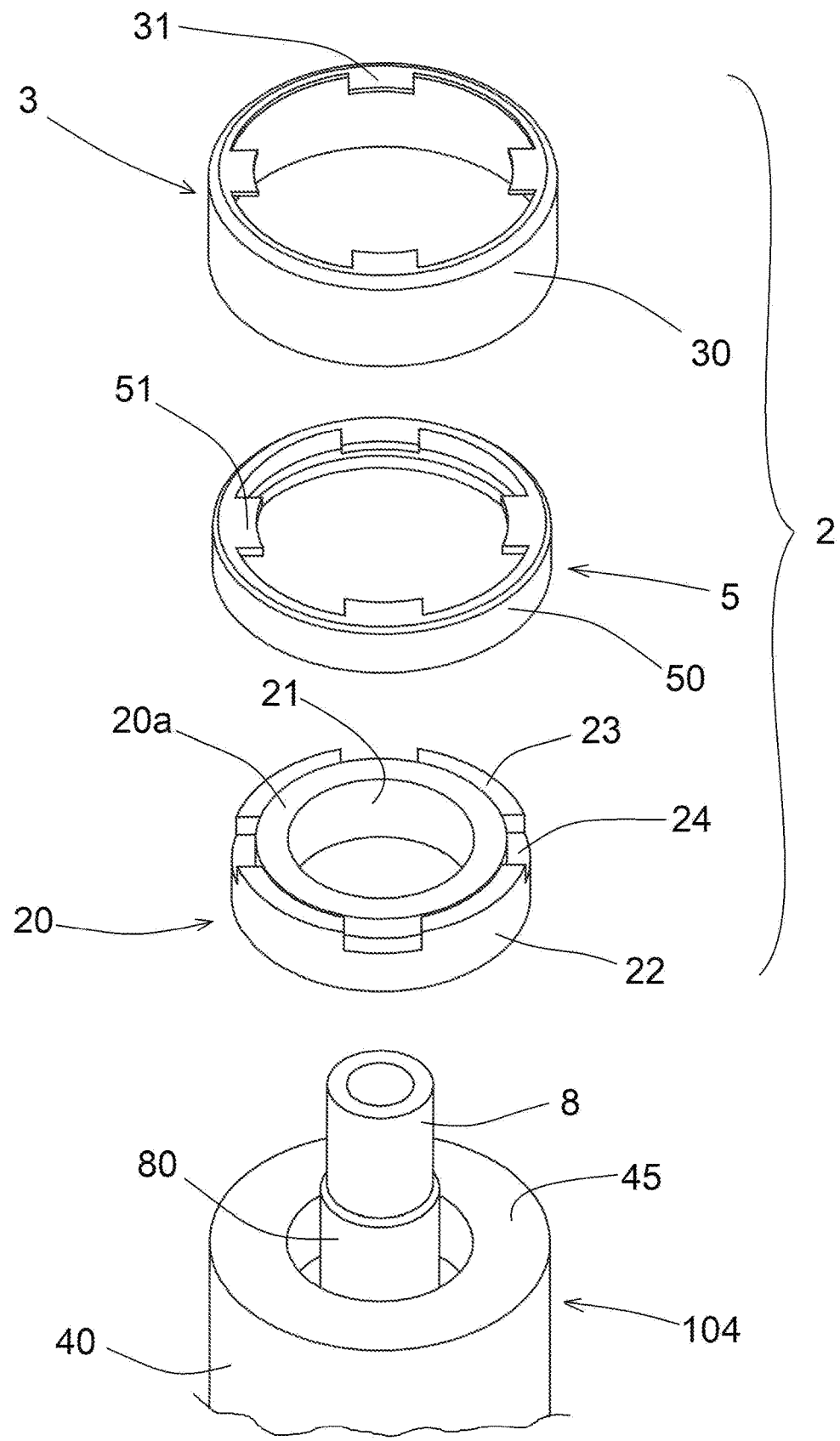
FIG. 6 is an exploded perspective view of the hollow shaft and of the elements of the rotary portion of the mechanical seal according to the invention.

With reference to FIG. 6, four radial fins (31) are angularly disposed in equidistant position by 90°.

The second seal ring (20) is blocked in the sleeve (3) by means of a cap (5) with annular shape, made of an elastomeric material. The cap (5) comprises a cylindrical lateral wall (50) and a plurality of radial fins (51) that protrude radially inwards from an upper edge of the cylindrical lateral wall of the cap. The radial fins (51) of the cap are disposed under the radial fins (31) of the sleeve.

The second seal ring (20) comprises a cylindrical portion (21) with a sliding surface (20a) with flat annular shape disposed on an upper edge of the cylindrical portion (21).

A cylindrical lateral wall (22) is disposed around the cylindrical portion (21). The cylindrical lateral wall (22) has an upper edge (23). The sliding surface (20a) protrudes in upper position relative to the upper edge (23) of the cylindrical lateral wall.

The upper edge (23) of the cylindrical lateral wall is provided with a plurality of recessed seats (24) suitable for receiving the fins (51) of the cap and the fins (31) of the sleeve overlapped to the fins (51) of the cap, in such a way to block the rotation of the second seal ring (20) and of the cap (5) relative to the sleeve (3).

With reference to FIG. 4, the sum of the thickness of a radial fin (51) of the cap and of a radial fin (31) of the sleeve is lower than the depth of the recessed seat (24), in such a way that the radial fins (31) of the sleeve are disposed at a lower level than the sliding surface (20a) of the second seal ring and do not interfere with the first seal ring (10).

Moreover, the height (h) of the cylindrical lateral wall (30) of the sleeve is higher than the height (h1) of the cylindrical lateral wall (50) of the cap. In view of the above, when the cap (5) is mounted in the sleeve (3), a fixing portion (35) is generated in a lower part of the cylindrical lateral wall (30) of the sleeve that remains free to be fixed to the rotary shaft (104).

The second seal ring has a lower edge (25) and the cap (5) has a lower edge (55). When the second seal ring (20) and the cap (5) are mounted inside the sleeve (3), the lower edges (25, 55) of the second seal ring (20) and of the cap (5) are disposed substantially at the same level.

The rotary shaft (104) has an external surface (40) and an upper ending surface (45) (FIG. 6).

Figure 5:
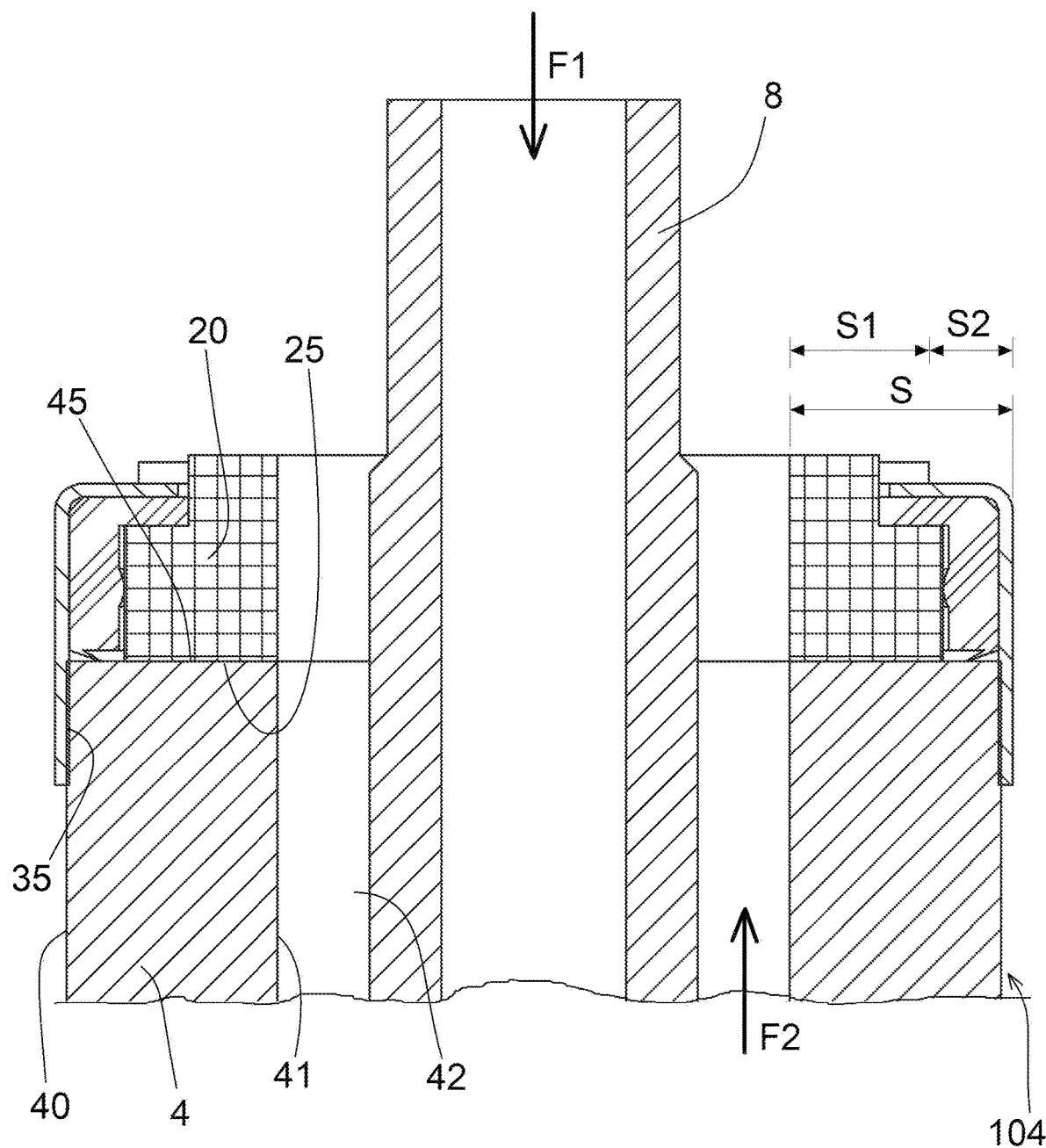
FIG. 5 is an axial view of the rotary portion of the seal of FIG. 3 fixed to the hollow shaft.

As shown in FIG. 5, the fixing portion (35) of the sleeve is fixed to the external surface (40) of the rotary shaft. The lower edge (25) of the second seal ring is in contact with the upper external surface (45) of the rotary shaft. Such an arrangement prevents the mechanical seal (100) from tilting.

It is to be noted that, unlike the prior art, the first seal ring (10) is disposed above the second seal ring and the two seal rings have respective sliding surfaces (10a, 20a) with a mean diameter (namely the mean value between the external diameter and the internal diameter of the sliding surface) that is lower than the external diameter of the rotary shaft (104).

The mechanical seal (100) is suitable for being used in an electrical motor for electrical vehicles that is provided with a coolant refrigeration system. In view of the above, the coolant is isolated by the mechanical seal (100) and prevented from going towards the bearings of the rotary shaft and the electrical parts of the engine.

With reference to FIGS. 3, 5 and 6, advantageously, the rotary shaft (104) comprises a hollow shaft (4) with an axial cavity wherein a conduit (8) is disposed axially for the introduction of a coolant in the direction of the arrow F1.

The hollow shaft (4) has an external surface (40) and an internal surface (41). The conduit (8) has an external surface (80). An annular empty space (42) in communication with the interior of the conduit (8) is generated between the external surface of the conduit (8) and the internal surface (41) of the hollow shaft (4). In view of the above, the coolant can flow in the annular empty space (42) in the direction of the arrow F2. The coolant circulates above the receptacle (11) of the fixed part of the seal and cannot penetrate the air chamber under the fixed part of the seal, in such a way that the electrical parts of the motor are not wetted.

In such a case, the fixing portion (35) of the sleeve (3) is fixed to the external surface (40) of the hollow shaft. The cap (5) is disposed inside the sleeve (3). The second seal ring (20) is disposed inside the cap (5).

In order to minimize a tilting movement of the mechanical seal (100), the lower surface (25) of the second seal ring (20) abuts on the upper ending surface (45) of the hollow shaft (4). The first seal ring (10) is disposed above the second seal ring (20). In view of the above, the conduit (8) passes through the second seal ring (20) and the first seal ring (10).

It is to be noted that the upper ending surface (45) of the hollow shaft (4) has a thickness (s) in radial direction that is higher than or equal to the sum of a maximum thickness (s1) of the second seal ring (20) and a thickness (s2) of the cap (5) in radial direction. In order to minimize the diameter of the sliding tracks (10a, 20a) of the seal, the internal diameter of the second seal ring (20) is equal to the internal diameter of the hollow shaft (4).

Considering that the internal and the external diameter of the hollow shaft (4) are fixed during the design stage, the mean diameter of the sliding surfaces (10a, 20a) of the first seal ring (10) and of the second seal ring (20) is lower than the external diameter of the hollow shaft (4).

In view of the above, the sliding surfaces (10a, 20a) of the two seal rings have the minimum possible diameter imposed by the radial dimensions of the hollow shaft (4).

We claim:

1. Mechanical seal comprising:
    a fixed part comprising a receptacle suitable for being fixed to a fixed structure;
    a rotary part comprising a rotary shaft having an upper ending surface and an external diameter and a sleeve having a fixing portion suitable for being fixed to said rotary shaft;
    a first seal ring mounted in such a way to slide axially inside the receptacle, said first seal ring having a sliding surface;
    a second seal ring mounted in the sleeve, said second seal ring having a sliding surface;
    a spring that is axially compressed between the receptacle and the first seal ring, in such a way to push said first seal ring towards said second seal ring so that the sliding surfaces are in contact to provide a seal;
    wherein said second seal ring extends radially inwards relative to said fixing portion of the sleeve, above said upper ending surface of the rotary shaft;
    said first seal ring is disposed above said second seal ring in such a way that the sliding surfaces of the first and of the second seal ring are in mutual contact;
    wherein the sliding surfaces of the first seal ring and of the second seal ring have a mean diameter that is lower than said external diameter of said rotary shaft;
    wherein said sleeve has a cylindrical lateral wall that comprises said fixing portion and said cylindrical lateral wall extends above said upper ending surface of the rotary shaft to contain said second seal ring;
    wherein said sleeve comprises a plurality of radial fins that protrude radially inwards from an upper edge of said lateral wall of the sleeve;
    wherein the second seal ring comprises s plurality of recessed seats that the radial fins engage;
    a cap made of flexible material disposed between the sleeve and the second seal ring and disposed above said upper ending surface of the rotary shaft; and
    wherein said cap comprises a plurality of radial fins in projecting position that are suitable for being engaged in said plurality of recessed seats of the second seal ring under said radial fins of the sleeve.

2. The mechanical seal of claim 1, wherein said rotary shaft comprises a hollow shaft wherein a conduit is disposed, extending inside the second seal ring and inside the first seal ring, said hollow shaft having an external surface, said fixing portion of the sleeve being fixed to the external surface of the hollow shaft.

3. The mechanical seal of claim 1, further comprising the cap made of elastomeric material.

4. The mechanical seal of claim 2, wherein the hollow shaft has an upper ending surface with a thickness in radial direction that is higher than or equal to the sum of a maximum thickness of the second seal ring and a thickness of the cap in radial direction.

5. The mechanical seal of claim 2, wherein said second seal ring has an internal diameter that is equal to the internal diameter of said hollow shaft.

6. The mechanical seal of 1, wherein
    said second seal ring comprises a cylindrical lateral wall provided with an upper edge with said plurality of recessed seats wherein said radial fins of the sleeve are engaged.

7. The mechanical seal of claim 1, wherein said cap comprises a cylindrical lateral wall provided with an upper edge with said plurality of radial fins.

8. Electric motor for electric vehicle provided with a cooling system comprising a rotary shaft that comprises a hollow shaft and a conduit disposed axially inside the hollow shaft for the circulation of a coolant inside the conduit and inside an empty space provided between the conduit and the hollow shaft, characterized in that it comprises a mechanical seal according to claim 2.

* * * * *